United States Patent
Laskowsky et al.

(10) Patent No.: US 12,046,906 B1
(45) Date of Patent: Jul. 23, 2024

(54) PREEMPTIVE OPTIMIZATION FOR OFFBOARD DISTRIBUTION OF ELECTRICAL POWER FROM A VEHICLE

(71) Applicant: GM GLOBAL TECHNOLOGY OPERATIONS LLC, Detroit, MI (US)

(72) Inventors: Patricia M. Laskowsky, Ann Arbor, MI (US); Aniket P. Kothari, Rochester Hills, MI (US); Bridget A. Beaton, Novi, MI (US); James Reilly, Castle Rock, CO (US); James C. Gibbs, Brighton, MI (US); Christopher Rowe, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 35 days.

(21) Appl. No.: 18/093,875

(22) Filed: Jan. 6, 2023

(51) Int. Cl.
| | |
|---|---|
| *H02J 3/32* | (2006.01) |
| *B60L 53/62* | (2019.01) |
| *B60L 53/66* | (2019.01) |
| *B60L 55/00* | (2019.01) |
| *H02J 3/00* | (2006.01) |
| *H02J 7/00* | (2006.01) |

(52) U.S. Cl.
CPC .............. *H02J 3/322* (2020.01); *B60L 53/62* (2019.02); *B60L 55/00* (2019.02); *H02J 3/001* (2020.01); *H02J 7/0048* (2020.01); *H02J 7/00712* (2020.01); *B60L 53/66* (2019.02); *B60L 2240/70* (2013.01)

(58) Field of Classification Search
CPC .......... H02J 3/322; H02J 3/001; H02J 7/0048; H02J 7/00712; B60L 55/00; B60L 53/62; B60L 53/66; B60L 2240/70
See application file for complete search history.

(56) References Cited

U.S. PATENT DOCUMENTS

| | | | |
|---|---|---|---|
| 2022/0181875 A1* | 6/2022 | North | B60L 53/63 |
| 2022/0379770 A1* | 12/2022 | Salter | H02J 3/001 |
| 2023/0268739 A1* | 8/2023 | Gaither | H02J 3/322 700/291 |
| 2023/0415602 A1* | 12/2023 | Salter | B60L 55/00 |

* cited by examiner

*Primary Examiner* — Carlos Amaya
(74) *Attorney, Agent, or Firm* — Quinn IP Law

(57) ABSTRACT

A preemptive optimization of a power distribution event associated with providing an electrical power from a battery onboard a vehicle to a charging station offboard the vehicle. The preemptive optimization may include preemptively charging the battery in advance of the power distribution event and/or preemptively configuring the vehicle and the battery, such as with establishment of standby session, to provide electrical power from the battery to the charging station without providing the electrical power to the charging station until the charging station thereafter experiences an outage, interrupt, etc.

18 Claims, 2 Drawing Sheets

PREEMPTIVE OPTIMIZATION FOR OFFBOARD DISTRIBUTION OF ELECTRICAL POWER FROM A VEHICLE

INTRODUCTION

The present disclosure relates to preemptive optimization for offboard distribution of electrical power from a vehicle, such as but not necessarily limited to vehicle-to-grid (V2G), vehicle-to-microgrid (V2M), vehicle to an externally connected electrical load (vehicle-to-load, or V2L), vehicle-to-home (V2H), vehicle-to-anything (V2X), or other offboard power distribution whereby a battery of the vehicle may be configured to provide electrical power to a charging station or other electrically operable device offboard the vehicle.

A vehicle, such as an electrical vehicle (EV), hybrid electric vehicle (HEV), etc., may include a battery configured to repeatedly store and discharge a large quantity of electrical power, optionally at a relatively high voltage potential. Particularly when configured to provide electrical power to drive and otherwise operate a vehicle, such a battery may be referred to as a traction battery, a rechargeable energy storage system, a battery pack, a battery cell(s), and the like. Given the electrical power storage capabilities of some vehicle batteries, it may be advantageous under certain circumstances to share the stored electrical power with devices offboard the vehicle, such as to facilitate vehicle-to-grid (V2G), a vehicle to an externally connected electrical load (vehicle-to-load, or V2L), a vehicle-to-home (V2H), a vehicle-to-anything (V2X), or other offboard power distribution whereby electrical power may be provided or otherwise discharged from the battery onboard the vehicle to a device, etc. offboard the vehicle. It can be challenging and problematic to predict when such offboard power distribution events may occur and challenging and problematic to prepare the battery and/or the vehicle in anticipation of such unpredictable events.

SUMMARY

One non-limiting aspect of the present disclosure relates to a preemptive optimization for offboard distribution of electrical power from a battery of a vehicle. The preemptive optimization may be sufficient to predict situations when an offboard power distribution event may occur, and in advance thereof, to prepare the battery, the vehicle, and/or an offboard device to facilitate transference of electrical power from the battery to the offboard device.

One non-limiting aspect of the present disclosure relates to a method for preemptive optimization of a vehicle-to-home (V2H) power distribution event where the V2H power distribution event may be used for providing a V2H electrical power from a battery onboard a vehicle to a charging station offboard the vehicle. The method may include processing one or more indicators to determine a time when the V2H power distribution event is expected, preemptively establishing in advance of the time a standby session between a charge controller onboard the vehicle and the charging station, with the standby session configuring the charging station and the charging controller to provide a V2H electrical power from the battery to the charging station, and after establishing the standby session, preventing the battery from providing the V2H electrical power to the charging station until occurrence of a charging station interrupt, and thereafter, implementing a V2H charging process for controlling the battery to provide the V2H electrical power to the charging station.

The method may include determining a charge level of the battery and preemptively implementing in advance of the time a battery charging process in response to the charge level of the battery being less than a charge threshold, with the battery charging process providing a charging station electrical power from the charging station to the battery for storage.

The method may include determining a charging schedule for one or more additional vehicles configured to be charged via an electrical power grid providing an electrical grid power, with the charging station relying upon the electrical grid power to power the charging station, and scheduling the battery charging process based on the charging schedule for the additional vehicles.

The method may include closing charging station contactors included on the charging station and closing battery contactors included on the vehicle as part of establishing the preemptive standby session.

The method may include determining an expected decrease in barometric pressure within an environment of the charging station and determining the time based on the expected decrease in barometric pressure.

The method may include determining a severe weather notification for an environment of the charging station and determining the time based on the severe weather notification.

The method may include determining a scheduled outage of a power grid configured to provide an electrical grid power to the charging station and determining the time based on the scheduled outage.

The method may include, after establishing the standby session, determining the charging station interrupt in response to an electrical grid power provided from an electrical power grid to power the charging station dropping below a charging station threshold.

The method may include, after establishing the standby session, determining the charging station interrupt in response to an interconnect device transitioning from a connected state to a disconnect state, the interconnect device configured to interconnect the charging station with an electrical power grid used to provide an electrical grid power to power the charging station, the connected state corresponding with the charging station being connected to the electrical power grid, and the disconnected state corresponding with the charging station being disconnected from the electrical power grid.

One non-limiting aspect of the present disclosure relates to a system for preemptive optimization of a vehicle-to-home (V2H) power distribution event, with the V2H power distribution event providing a V2H electrical power from a battery onboard a vehicle to a charging station offboard the vehicle. The system may include a prediction module configured for processing one or more indicators to determine a V2H time when the V2H power distribution event is expected, a station controller configured for preemptively implementing a battery charging process in advance of the V2H time, with the battery charging process providing a charging station electrical power from the charging station to the battery for storage and the charging station generating the charging station electrical power from an electrical grid power provided thereto from an electrical power grid offboard the vehicle, and a battery controller configured for implementing a battery discharging process for providing the V2H electrical power from the battery to the charging station in response to the electrical grid power dropping below a charging station threshold.

The prediction module may be configured to determine a barometric pressure within an environment of the charging station and to determine the V2H time based on the expected decrease in barometric pressure.

The prediction module may be configured to determine a severe weather notification for an environment of the charging station and to determine the V2H time based on the severe weather notification.

The prediction module may be configured to determine a scheduled outage of the electrical grid and to determine the V2H time based on the scheduled outage.

The prediction module may be configured to provide the station controller with a battery charging time, the battery charging time indicating when to implement the battery charging process.

The prediction module may be configured to provide the battery controller with a battery discharging time, the battery charging time indicating when to implement the battery discharging process.

The prediction module may be configured to determine the battery charging time to occur before the V2H time and to determine the battery discharging time to occur after the battery charging time.

The station controller and the battery controller may be configured to establish a standby session after the battery charging process and in advance of the V2H time and the battery discharging process.

One non-limiting aspect of the present disclosure relates to a controller configured for preemptive optimization of a vehicle-to-grid (V2G) power distribution event, with the V2G power distribution event providing V2G electrical power from a battery onboard a vehicle to a charging station offboard the vehicle and the controller including a plurality of non-transitory instructions stored on a computer readable storage medium, which when executed with a processor of the controller, are configured for: determining a V2G time when the V2G power distribution event is expected; preemptively implementing a battery charging process in advance of the V2G time, the battery charging process providing a charging station electrical power from the charging station to the battery for storage, the charging station generating the charging station electrical power from an electrical grid power provided thereto from an electrical power grid offboard the vehicle; and implementing, after the battery charging process and in response to a grid outage of the electrical power grid, a battery discharging process to provide the V2G electrical power from the battery to the charging station in compensation for the grid outage.

The non-transitory instructions may be configured for determining the V2G time based on more a barometric pressure within an environment of the charging station, a severe weather notification for an environment of the charging station, and a scheduled outage of the power grid configured to provide the electrical power supply to the charging station.

The non-transitory instructions may be configured for determining a charging schedule for one or more additional vehicles configured to be charged via the electrical power grid and for scheduling the battery charging process to mitigate overloading the electrical power grid.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
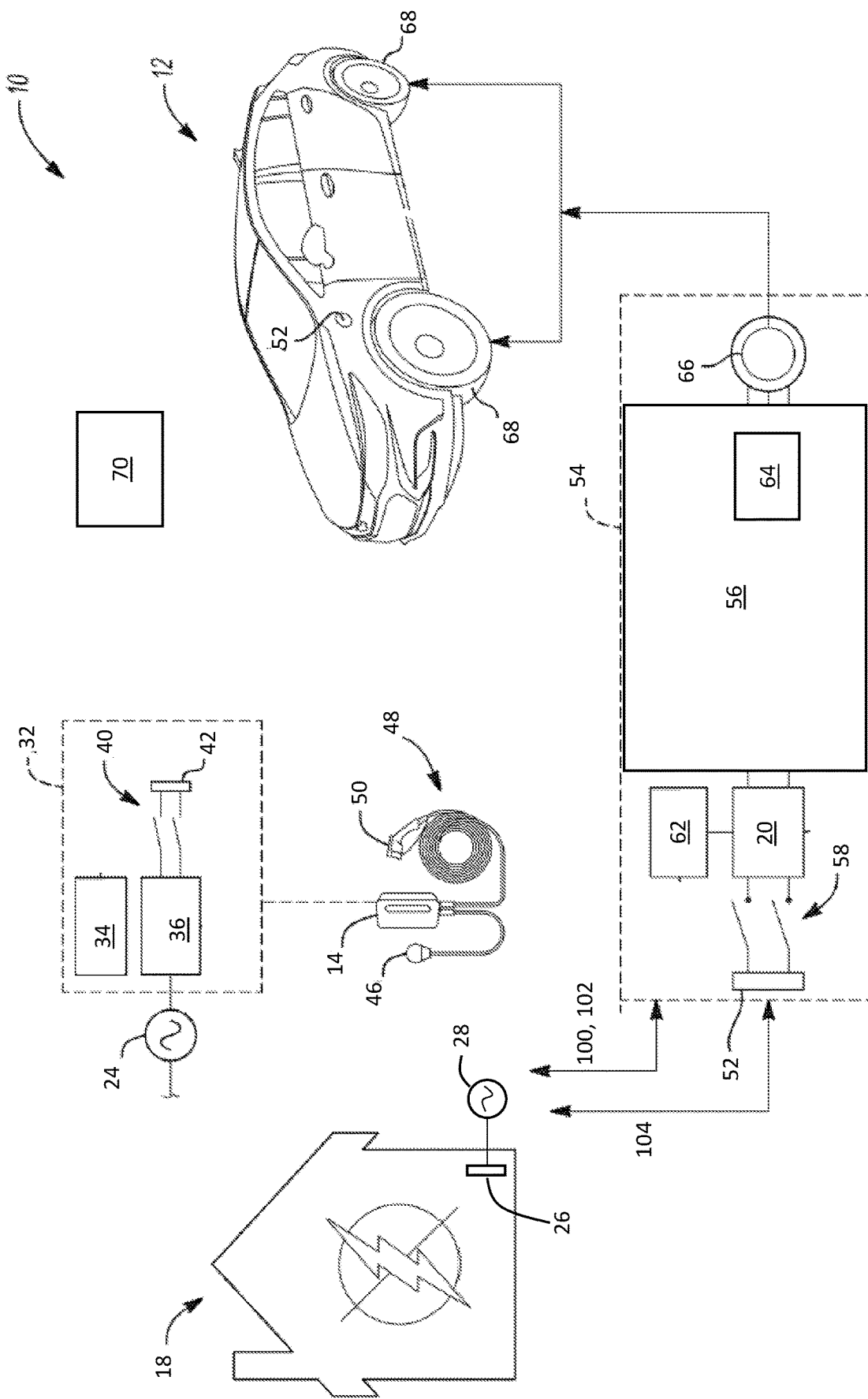
FIG. 1 illustrates a schematic view of a preemptive optimization system in accordance with one non-limiting aspect of the present disclosure.

FIG. 1 illustrates a schematic view of a preemptive optimization system 10 in accordance with one non-limiting aspect of the present disclosure. The system 10 may be configured to facilitate exchanging electrical power between a vehicle 12 and a load or other device 14, which is shown for illustrative purposes to correspond with the load 14 being offboard the vehicle 12. The system 10 may be configured to deliver vehicle-to-grid (V2G), vehicle to an externally connected electrical load (vehicle-to-load, or V2L), vehicle-to-home (V2H), vehicle-to-anything (V2X), or other offboard power distribution and/or exchange whereby electrical power may be provided, discharged, or otherwise exchanged between the vehicle 12 and the load 14. The system 10 is predominately described with respect to an exemplary embodiment whereby the load 14 may be a charging station 14 included in a home 18 to facilitate V2H and/or V2G power exchange with a battery 20 or other electrical storage system (ESS) of the vehicle 12. This is done for non-limiting purposes as the present disclosure fully contemplates preemptively predicting and preparing for other types of power distribution events beyond those associated with V2H and/or V2G.

The charging station 14 may be configured as an interface between a home electrical power distribution system or circuit 24 of the home 18 and the vehicle 12. The home electrical power distribution system 24 may include an interconnect device, a microgrid interconnect device (MID), a fuse box, etc. 26 configured to facilitate interfacing the home electrical power distribution system 24 with an electrical power grid 28, such as but not necessarily limited to a utility type of electrical power grid 28 configured to provide electrical power to multiple customers, homes, locations, etc., optionally with some of those customers similarly including a charging station (not shown) for exchanging electrical power with another vehicle (not shown). The interconnect device 24 may be configured to disconnect or isolate the home electrical power distribution system 24 from the electrical power grid 28 under certain circumstances, such as in response to a command from the charging station 14, in response to a command from a service supplier of the electrical power grid 28, in response to sensing an electrical grid power of the electrical grid 28 experiencing a power outage or otherwise dropping below a predefined grid threshold, etc.

The charging station 14 may include a charging circuit 32 with a station controller 34 configured to facilitate controlling the operation thereof and/or to facilitate additional operations associated with the present disclosure. The station controller 34 may include a plurality of non-transitory instructions stored on a computer readable storage medium, which when executed with an associated processor, may be sufficient to control the operation thereof. The charging station 14 may additionally include an alternating current (AC) to direct current (DC) inverter (AC-DC) or bidirectional inverter (BDI) 36 configured to bidirectionally convert and exchange AC electrical power with the home electrical power distribution system 24 and DC electrical power with one or more charge contactors 40 included as part of a charge receptacle 42 configured to interface with the battery 20. The charging station 14 may include an AC power cord 46 to facilitate powering the charging station 14 using electrical power provided over the home electrical power distribution system 24. An electric vehicle supply equipment (EVSE) cord set 48 may be configured to facilitate exchanging electrical power between the charging station 14 and the vehicle 12, which is shown with respect to exchanging DC electrical power between the charging station 14 and the battery 20 for exemplary non-limiting purposes as the present disclosure fully contemplates exchanging AC electrical power between the charging station 14 and the vehicle 12.

The EVSE cord set 48 may include a charging plug 50, such as but not limited to a multi-pin SAE J1772 compatible connector, to facilitate electrically connecting the charging station 14 with a charging port 52 located on the vehicle 12. A battery system 54 onboard the vehicle 12 may be configured to interface the charging port 52 with an electric powertrain 56 configured to propel the vehicle 12. The battery system 54 may include one or more main contactors 58 interfaced via the cord set 48 with the station contactors 40 such that the respective contactors 40, 58 may be controllable between opened and closed positions to selectively control the exchange of electrical power between the AC-DC inverter 36 and the battery 20. The battery system 54 may include a battery controller 62 configured to facilitate controlling the operation thereof, charging and discharging of the battery 20, and/or additional operations associated with the present disclosure. The battery controller 62 may include a plurality of non-transitory instructions stored on a computer readable storage medium, which when executed with an associated processor, may be sufficient to implement the desired operation thereof. The battery controller 62 may operate in cooperation with a traction power inverter module (TPIM) 64 to facilitate providing electrical power to an electric traction motor 66 used to drive one or more wheels 68 and/or to generate electrical power from rotation of the vehicle wheels 68 or other vehicle system (e.g., solar and/or fuel cell) for purposes of recharging the battery 20.

The battery 20 may be configured to repeatedly store and discharge a large quantity of electrical power, optionally at a relatively high voltage potential. Particularly when configured to provide electrical power to drive and otherwise operate the vehicle 12, the battery 20 may be referred to as a traction battery, a rechargeable energy storage system, a battery pack, a battery cell(s), and the like. Given the electrical power storage capabilities of the battery 20, it may be advantageous under certain circumstances to share the stored electrical power with devices offboard the vehicle 12, such as to facilitate discharging DC electrical power to the charging station 14 for purposes of providing V2H electrical power to the AC-DC inverter 36, whereby the AC-DC inverter 36 may invert the V2H electrical power to AC electrical power sufficient for distribution over the home electrical power distribution system 24 to additional devices electrically connected thereto, including being interfaced with the electrical power grid 28 to power additional devices connected thereto. The electrical interconnect 26 may optionally be tripped or otherwise actuated from a normally connected state to a disconnected state to electrical disconnect the home electrical power distribution system 24 from the electrical power grid 28, which may be helpful in preventing the V2H electrical power provided from the battery 20 being distributed over the electrical power grid 28.

One non-limiting aspect of the present disclosure contemplates preemptive optimization for a V2H power distribution event. The V2H power distribution event, for example, may correspond with a need to provide V2H electrical power from the vehicle 12 to their charging station 14, or more specifically, from the battery 20 to the AC-DC inverter 36 for subsequent transport over the home electrical power distribution system 24. The V2H distribution event be considered as a circumstance where it may be desirable to facilitate powering one or more electrical devices connected to the home 18 electrical distribution system using electrical power provided from the battery 20, such as in response to an outage or other interrupt in the supply of electrical grid power provided to the home 18 from the electrical power being interrupted or limited. The electrical grid power available from the electrical grid 28 may be unavailable, interrupted, diminished, etc. for or due to a number of reasons and circumstances, including environmental conditions, severe weather, scheduled maintenance interruption, inadvertent line severance, and the like, which at times may be unpredictable or unforeseeable.

The system 10 may include a prediction module 70 configured in accordance with the present disclosure to facilitate predicting when a V2H power distribution event may occur. Rather than waiting for such unpredictable situations to arise, one non-limiting aspect of the present disclosure contemplates the prediction module 70 being configured to instantiate a preemptive optimization. The prediction module 70 may include a plurality of non-transitory instructions stored on a computer readable storage medium, which when executed with an associated processor, may be sufficient to implement the desired operation thereof. The prediction module 70, for example, may be configured to preemptively predict situations when the V2H power distribution event may occur, and in advance thereof, to prepare the battery 20, the vehicle 12, and the charging station 14 to facilitate transference of V2H electrical power from the battery 20 to the charging station 14. While the present disclosure fully contemplates its use and application in being reactive to or acting after determining an actual outage of the electrical grid 28, the described capabilities to preemptively predict a future outage and to prepare for that outage ahead a time is believed to be more beneficial and a greater improvement in facilitating the attendant transference of electrical power from the vehicle 12 to the charging station 14.

Figure 2:
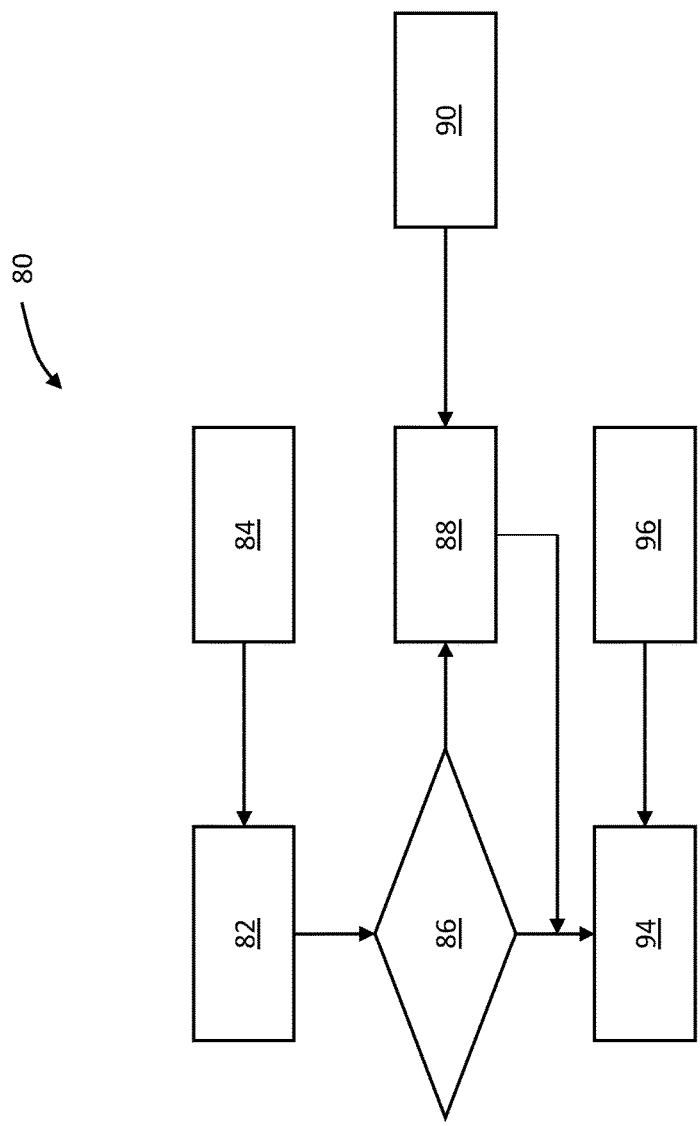
FIG. 2 illustrates a flowchart of a method for preemptive optimization of a V2H power distribution event in accordance with one non-limiting aspect of the present disclosure.

FIG. 2 illustrates a flowchart 80 of a method for preemptive optimization of a V2H power distribution event in accordance with one non-limiting aspect of the present disclosure. The method is predominantly described with respect to a V2H power distribution event whereby a need may arise to provide V2H electrical power, such as the above-described DC electrical power, from the battery 20 to the charging station 14 for subsequent distribution over the home electrical power distribution system 24. This is done for illustrative purposes as the method may be similarly useful in facilitating the transference of electrical power to another load, such as in a V2G manner from the vehicle 12 directly to the electrical grid 28. The illustrated embodiment is believed to be helpful in demonstrating the capabilities of the present disclosure to maximize the benefits of the contemplated preemptive optimization in a location where a user may be periodically, and often unexpectedly, separated from the electrical grid 28 while a vehicle is nearby and capable of providing electrical power to augment, supplement, or replace the loss of electrical power from the electrical grid 28.

Block 82 relates to implementing a prediction process whereby the prediction module 70, the station controller 34, the battery controller 62, a back office (not shown), or other entity may include capabilities for wirelessly and/or wiredly communicating with each other. The prediction process may include one or more of these elements, optionally based on communications therebetween, preemptively determining a time, which may be designated as a V2H time, when a V2H power distribution event is expected. The measure of such time may be based on a clock, an event, or other temporal reference sufficient for providing guidance for preemptively undertaking the activities contemplated there. The time referenced herein, as such, is not intended to limit to a particular methodology for tracking or measuring the occurrence or passing of time. Block 84 relates to an indicator collection process for collecting a plurality of indicators that may be used in cooperation with the prediction process to determine, calculate, estimate, predict, etc. the V2H time. The prediction process may be used to process variables, information, data, etc. associated with the indicators to determine in advance of an actual power outage when the electrical power grid 28 may be expected to experience an outage. The corresponding processes may include determining an expected or actual decrease in barometric pressure within an environment of the charging station 14 and determining the V2H time based on the change in barometric pressure, determining a severe weather notification for an environment of the charging station 14 and determining the V2H time based on the severe weather notification, and/or determining a scheduled outage of the electrical grid 28 and determining the V2H time based on the scheduled outage. The indicators may be determined using wireless resources and/or sensors available at the home 18 and/or from the prediction module 70, which may include a variety of indicators associated with events leading to power disruption.

Block 86 relates to implementing a preemptive charging process whereby the prediction module 70, the charge controller, the battery controller 62, the back office, or other entity determines whether it would be advantageous to preemptively charge the battery 20 before the V2H time. It may be desirable to preemptively charge the battery 20 in the event a state of charge (SOC) or other measure of stored electrical power for the battery 20 is below a battery threshold. The battery threshold may correspond with a minimum SOC for the battery 20 needed in order to enable the battery 20 to provide a V2H electrical power to the charging station 14. The battery threshold may, alternatively, correspond with a maximum SOC for the battery 20, which may be greater than a normal or typical SOC threshold, e.g., it may be desirable to preemptively charge the battery 20 beyond its typical charge range in order to maximize the amount of stored electrical potential so that the battery 20 may provide more electrical power than it typically would when considered as fully charged, e.g., to charge the battery 20 to 100% SOC to preempt an owner preference for a lower charging threshold, such as an owner preference for 80% SOC. Such charging control of the battery 20 may be beneficial in maximizing the amount of electrical power available therefrom when the V2H power distribution event may be imminent.

Block 88 relates to implementing a battery charging process in advance of the V2H time in response to the preemptive charging process determining a desirability for preemptive battery charging. Block 90 relates to a charging schedule process for determining a battery charging time needed for the charging station 14 to provide a charging station electrical power to the battery 20 for storage. The battery charging time may correspond with a time of day needed for the battery 20 to be connected and/or an amount or a duration of time (e.g., minutes or hours) that the battery 20 may need to be connected in order to receive the charging station electrical power required for charging the battery 20 to the battery threshold. The battery charging may be selected to occur before for the V2H time and/or determined based on a charging schedule for one or more additional vehicles configured to be charged via the electrical grid 28. In the event the vehicle 12 is disconnected from the charging station 14 prior to the battery charging time and/or the V2H time, the charge controller and/or the prediction module 70 may be configured to notify an operator of the vehicle 12 of the battery charging time and the desirability of connecting the vehicle 12 to the charging station 14 in advance thereof so that the battery charging may occur before the expected V2H power distribution event.

The battery charging time, for example, may be scheduled to mitigate overloading the electrical grid 28 by scheduling the battery charging time to occur before the V2H time, such as when the chances of overloading the electrical grid 28 may be minimized. The prediction module 70 may be configured to interact with a utility provider of the electrical grid 28 to assess the charging demands of the additional vehicles and/or to otherwise assess operational operating needs thereof that may be influential in determining a desirable battery charging time before the V2H time. The battery charging time may also be selected to occur before a normal or a customer preferred charging time for the vehicle 12, e.g., before the vehicle 12 is normally charged during the night or another preferred or lower costs charging period, which may be helpful to ensure a complete preemptive, battery charging before the V2H time.

Block 94 relates to implementing a battery discharging process for determining when a battery discharge is needed for controlling the battery 20 to discharge the V2H electrical power to the charging station 14. The battery discharge may be specified according to a time of day and/or another trigger, such as in response to the electrical grid power available from the electrical grid dropping below the grid threshold, a need to electrically isolate the home power distribution system from the electrical grid 28, e.g., a homeowner may intentionally actuate the electrical interconnect from the normally connected state to the disconnected state, etc. The battery 20 discharging time may be set to correspond with the actual occurrence of the V2H power distribution event, i.e., the condition or set of conditions associated with a desirability of providing electrical power from the battery 20 to the charging station 14 for disbursement throughout the home 18. In the event the charging station 14 requires a predefined amount of electrical power to transfer electrical power from the battery 20 thereto, it may be beneficial to schedule the battery discharging time to occur in advance of the charging station 14 losing its power and/or in advance of a backup battery (not shown) of the charging station 14 dropping below and operational threshold needed for the charging station 14.

Block 96 relates to a session establishment process for establishing a standby session between the charging station 14 and the vehicle 12, or more specifically between the station controller 34 and the battery controller 62. The standby session may be a communication type of session established in advance of the V2H time and the battery charging time for purposes of preparing the charging station 14 and the vehicle 12 for the V2H power distribution event. Establishing the standby session may include the station controller 34 and the battery controller 62 exchanging data and/or other information needed to establish protocols, discharge levels, charging levels, and/or other parameters needed to exchange electrical power between the charging station 14 and the battery 20. The present disclosure contemplates its use and application in facilitating electrical power exchange between various types of charging stations and various types of batteries, which may occur according to a number of protocols and standards, and as such, is not intended to be limited to a particular protocol or standard. In the case of the commonly employed SAE J1772 connector noted above and the commonly employed DIN 70121 standard, establishing the standby session may correspond with exchanging information needed to provide the V2H electrical power from the battery 20 to the charging station 14 without concurrently or contemporaneously transferring that electrical power.

The standby session, for example, may correspond with the station controller 34 and the battery controller 62 exchanging information using a control pilot (CP) signal 100, establishing a proximity circuit connection or signal (PRX) 102, and closing the station contactors 40 and the battery contactors 58 without concurrently transferring electrical power therethrough. The CP and PRX signals 100, 102, and information associated therewith may be exchanged using a minimal amount of electrical power transfer through corresponding pins of the cord set 48, which may be independent of additional pins of the cord set 48 utilized for establishing an electrical connection 104 between the DC-DC inverter 36 and the battery 20, e.g., the cord set 48 may include separate, DC connector pins included as part of the charge cord set. The battery and/or station controllers 34, 62 may include additional circuitry (not shown) or other controllers to facilitate establishing the standby session without concurrently using the session to transfer the V2H electrical power. The session establishment process may additionally include controlling the control interconnect 26 from the closed state to the opened state and/or setting a timer or a timer override to prevent closing the session. In the event the vehicle 12 is disconnected from the charging station 14 before a standby time determined for implementing the standby session, the operator may be messaged to connect the vehicle 12 so that the standby session may be established in advance of the V2H time.

As supported above, the present disclosure may be operable for use with an electric vehicle high voltage (HV) to provide backup power for a home, with the benefit of the attendant system be configured to be started quickly and efficiently in the event of a utility power outage. One embodiment of the present disclosure may include offboard equipment (HUB (charging station), bi-directional EVSE, BDI (inverter)) working in concert with a vehicle to initiate a V2H mode of operation whereby the HUB or the HEMS (High Energy Management System) manages the HV energy bus (in the case of other PVs such as solar) and to command the MID to become grid isolated. The present disclosure may be beneficial in providing a relatively seamless transition during a power outage by going from grid provided power to EV provided power if the EV and EVSE station have already entered a digital communication session. This may allow a backup battery of the charging station to save some energy by avoiding initiation of a charge/discharge session, cable check and pre-charge while not connected to the electrical power grid via the home power distribution system, i.e., the grid may be used to provide the power for the initiation, cable, and pre-charge.

When weather related parameters indicate an impending severe weather event (e.g., barometer pressure drop, wind speed, etc.) and/or a severe weather notice has been issued; the EVSE working with the HUB may wake up and initiate a charging communication session with the vehicle. The session may reach an active current demand request and enter the standby mode. If the SOC is not at 100%, the EV/EVSE may initiate a charge session, or alternatively if the customer vehicle is part of a utility V1G schedule, a negotiation process may occur with the utility supplier to establish a charging session to obtain as much energy in the battery before a predicted outage. When a planned outage, such as a demand response requested by the utility company, the customer preference to delay charge or optimize charge and charge the vehicle may be overridden to implementing battery charging sooner or, for customers on a V1G program, a negotiation process may be used with the utility supplier to schedule a battery charging session that levels fleet power usage within the grid and prevents grid overload. If the charge completes or reaches predetermined max SOC, a standby mode/session may be entered. When there is insufficient utility/grid capability to fully charge all of the fleet, an energy allocation per customer may be calculated in order to maximize the number of customers that may be preemptively charging using the electrical power grid.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for preemptive optimization of a vehicle-to-home (V2H) power distribution event, the V2H power distribution event providing a V2H electrical power from a battery onboard a vehicle to a charging station offboard the vehicle, comprising:
   processing one or more indicators to determine a time when the V2H power distribution event is expected;
   preemptively establishing in advance of the time a standby session between a charge controller onboard the vehicle and the charging station, the standby session configuring the charging station and the charging controller to provide a V2H electrical power from the battery to the charging station; and
   after establishing the standby session, preventing the battery from providing the V2H electrical power to the charging station until occurrence of a charging station interrupt, and thereafter, implementing a V2H charging process for controlling the battery to provide the V2H electrical power to the charging station; closing charging station contactors included on the charging station and closing battery contactors included on the vehicle as part of establishing the standby session; establishing the standby session in advance of implementing the V2H charging process, the standby session including the charging station and the charge controller: exchanging information using a control pilot (CP) signal; establishing a proximity circuit connection or signal (PRX); and closing the station contactors and the battery contactors without concurrently transferring the V2H electrical power therethrough.

2. The method according to claim 1, further comprising:
   determining a charge level of the battery; and
   preemptively implementing in advance of the time a battery charging process in response to the charge level of the battery being less than a charge threshold, the battery charging process providing a charging station electrical power from the charging station to the battery for storage.

3. The method according to claim 2, further comprising:
   determining a charging schedule for one or more additional vehicles configured to be charged via an electrical power grid providing an electrical grid power, the charging station relying upon the electrical grid power to power the charging station; and
   scheduling the battery charging process based on the charging schedule for the additional vehicles.

4. The method according to claim 1, further comprising:
   determining an expected decrease in barometric pressure within an environment of the charging station; and
   determining the time based on the expected decrease in the barometric pressure.

5. The method according to claim 1, further comprising:
   determining a severe weather notification for an environment of the charging station; and
   determining the time based on the severe weather notification.

6. The method according to claim 1, further comprising:
   determining a scheduled outage of a power grid configured to provide an electrical grid power to the charging station; and
   determining the time based on the scheduled outage.

7. The method according to claim 1, further comprising:
   after establishing the standby session, determining the charging station interrupt in response to an electrical grid power provided from an electrical power grid to power the charging station dropping below a charging station threshold.

8. The method according to claim 1, further comprising:
   after establishing the standby session, determining the charging station interrupt in response to an interconnect device transitioning from a connected state to a disconnect state, the interconnect device configured to interconnect the charging station with an electrical power grid used to provide an electrical grid power to power the charging station, the connected state corresponding with the charging station being connected to the electrical power grid, the disconnected state corresponding with the charging station being disconnected from the electrical power grid.

9. A system for preemptive optimization of a vehicle-to-home (V2H) power distribution event, the V2H power distribution event providing a V2H electrical power from a battery onboard a vehicle to a charging station offboard the vehicle, comprising:
   a prediction module configured for processing one or more indicators to determine a V2H time when the V2H power distribution event is expected;
   a station controller configured for preemptively implementing a battery charging process in advance of the V2H time, the battery charging process providing a charging station electrical power from the charging station to the battery for storage, the charging station generating the charging station electrical power from an electrical grid power provided thereto from an electrical power grid offboard the vehicle;
   a battery controller configured for implementing a battery discharging process for providing the V2H electrical power from the battery to the charging station in response to the electrical grid power dropping below a charging station threshold; and
   wherein the station controller and the battery controller are configured to establish a standby session after the battery charging process and in advance of both of the V2H time and the battery discharging process, the standby session including the station controller and the battery controller:
   exchanging information using a control pilot (CP signal);
   establishing a proximity circuit connection or signal (PRX) between the charging station and the battery; and
   closing station contactors included on the charging station and battery contactors included on the vehicle without concurrently transferring the V2H electrical power therethrough.

10. The system according to claim 9, wherein:
the prediction module is configured to:
   determine a barometric pressure within an environment of the charging station and to determine the V2H time based on the expected decrease in the barometric pressure;
   determine a severe weather notification for an environment of the charging station and to determine the V2H time based on the severe weather notification and/or,
   determine a scheduled outage of the electrical grid and to determine the V2H time based on the scheduled outage.

11. The system according to claim 9, wherein:
the prediction module is configured to provide the station controller with a battery charging time, the battery charging time indicating when to implement the battery charging process.

12. The system according to claim 11, wherein:
the prediction module is configured to provide the battery controller with a battery discharging time, the battery charging time indicating when to implement the battery discharging process after the standby session has been established.

13. The system according to claim 12, wherein:
the prediction module is configured to:
   determine the battery charging time to occur before the V2H time and to determine the battery discharging time to occur after the battery charging time; and
   set a timer override to prevent closing of the standby session until commencement of the battery discharging process.

14. A controller configured for preemptive optimization of a vehicle-to-grid (V2G) power distribution event, the V2G power distribution event providing V2G electrical power from a battery onboard a vehicle to a charging station offboard the vehicle, the controller including a plurality of non-transitory instructions stored on a computer readable storage medium, which when executed with a processor of the controller, are configured for:
   determining a V2G time when the V2G power distribution event is expected;
   preemptively implementing a battery charging process in advance of the V2G time, the battery charging process providing a charging station electrical power from the charging station to the battery for storage, the charging station generating the charging station electrical power from an electrical grid power provided thereto from an electrical power grid offboard the vehicle;
   implementing, after the battery charging process and in response to a grid outage of the electrical power grid, a battery discharging process to provide the V2G electrical power from the battery to the charging station in compensation for the grid outage; and
   establishing a standby session after the battery charging process and in advance of the battery discharging process, the standby session including:
      exchanging information between a station controller of the charging station and battery controller of the battery using a control pilot (CP) signal, the information including data needed to establish protocols, discharge levels, charging levels, and/or other parameters needed to exchange electrical power between the charging station and the battery;
      establishing a proximity circuit connection or signal (PRX) between the charging station and the battery;
      closing station contactors included on the charging station and battery contactors included on the vehicle without concurrently transferring the V2G electrical power therethrough; and
      setting a timer override to prevent closing of the standby session until implementation of the battery discharging process.

15. The method according to claim 1, further comprising:
the standby session including the charging station and the battery controller exchanging data and/or other information needed to establish protocols, discharge levels, charging levels, and/or other parameters needed to exchange electrical power between the charging station and the battery.

16. The method according to claim 15, further comprising:
setting a timer override to prevent closing of the standby session until implementation of the V2H charging process.

17. The system according to claim 9, wherein:
establishing the standby session includes the station controller and the battery controller exchanging data and/or other information needed to establish protocols, discharge levels, charging levels, and/or other parameters needed to exchange electrical power between the charging station and the battery.

18. The system according to claim 17, further comprising:
a controller configured for facilitating the standby session without concurrently using the session to transfer the V2H electrical power.

* * * * *